US012771910B2

(12) United States Patent
Merchant et al.

(10) Patent No.: US 12,771,910 B2
(45) **Date of Patent: *Oct. 20, 2026**

(54) USE OF WATERMARKING TO TRIGGER FINGERPRINT-RELATED ACTION

(71) Applicant: ROKU, INC., San Jose, CA (US)

(72) Inventors: Shashank C. Merchant, Sunnyvale, CA (US); John S. Stavropoulos, Edison, NJ (US); Benjamin J. Ropke, Rochelle, NY (US); Steven M. Cormie, Cambridge (GB)

(73) Assignee: ROKU, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/272,050

(22) Filed: Jul. 17, 2025

(65) Prior Publication Data

US 2025/0343980 A1 Nov. 6, 2025

Related U.S. Application Data

(63) Continuation of application No. 18/661,845, filed on May 13, 2024, now Pat. No. 12,389,088, which is a (Continued)

(51) Int. Cl.

| | |
|---|---|
| ***H04N 21/83*** | (2011.01) |
| ***G06F 21/16*** | (2013.01) |
| ***H04N 21/235*** | (2011.01) |
| ***H04N 21/44*** | (2011.01) |
| ***H04N 21/4415*** | (2011.01) |
| ***H04N 21/8358*** | (2011.01) |

(52) U.S. Cl.

CPC ......... *H04N 21/8358* (2013.01); *G06F 21/16* (2013.01); *H04N 21/2353* (2013.01); *H04N 21/44008* (2013.01); *H04N 21/4415* (2013.01)

(58) Field of Classification Search

None

See application file for complete search history.

(56) References Cited

U.S. PATENT DOCUMENTS 10,506,275 B1 * 12/2019 Thielen ............ H04N 21/43072
10,735,782 B2 * 8/2020 Gordon .............. H04N 21/4405
(Continued)

*Primary Examiner* — Mushfikh I Alam

(74) *Attorney, Agent, or Firm* — STERNE, KESSLER, GOLDSTEIN & FOX P.L.L.C.

(57) ABSTRACT

Use of watermarking in a media stream as a trigger for carrying out a fingerprint-related action, such as starting to generate fingerprints of the media stream, increasing a rate of generation of fingerprints of the media stream, starting to report fingerprints of the media stream, requesting fingerprints, or engaging in a fingerprint comparison. In an implementation, a media client that is processing the media stream could detect the watermark in the media stream and could responsively carry out or cause to be carried out a fingerprint-related action. Or an entity in a media-distribution path along which the media stream flows to a media client could detect the watermark in the media stream and could responsively carry out or cause to be carried out a fingerprint-related action. Further, the watermark could be inserted into the media stream in the first place based on transport-stream carried metadata, among other possibilities.

20 Claims, 6 Drawing Sheets

Related U.S. Application Data continuation of application No. 17/648,638, filed on Jan. 21, 2022, now Pat. No. 12,015,833, which is a continuation of application No. 15/929,219, filed on Feb. 6, 2020, now abandoned.

(60) Provisional application No. 62/882,217, filed on Aug. 2, 2019, provisional application No. 62/882,202, filed on Aug. 2, 2019, provisional application No. 62/865,613, filed on Jun. 24, 2019, provisional application No. 62/809,360, filed on Feb. 22, 2019.

(56) References Cited

U.S. PATENT DOCUMENTS

| | | | | |
|---|---|---|---|---|
| 2002/0162118 | A1* | 10/2002 | Levy | H04N 21/44008<br>348/E7.071 |
| 2014/0114455 | A1* | 4/2014 | Larsen | H04H 60/377<br>700/94 |
| 2019/0082231 | A1* | 3/2019 | Chen | G06V 20/46 |
| 2021/0344976 | A1* | 11/2021 | Sharifi | H04N 21/84 |
| 2022/0109715 | A1* | 4/2022 | Cormie | H04L 65/1089 |

* cited by examiner

USE OF WATERMARKING TO TRIGGER FINGERPRINT-RELATED ACTION

REFERENCE TO RELATED APPLICATIONS

This application is a continuation of U.S. patent application Ser. No. 18/661,845, filed May 13, 2024, which is a continuation of U.S. patent application Ser. No. 17/648,638, filed Jan. 21, 2022, which is a continuation of U.S. patent application Ser. No. 15/929,219, filed Feb. 6, 2020, which claims priority to U.S. Provisional Patent Application No. 62/809,360, filed Feb. 22, 2019, U.S. Provisional Patent Application No. 62/865,613, filed Jun. 24, 2019, U.S. Provisional Patent Application No. 62/882,217, filed Aug. 2, 2019, and U.S. Provisional Patent Application No. 62/882,202, filed Aug. 2, 2019, which are all incorporated herein by reference in their entireties.

BACKGROUND

A typical media client operates to receive an analog or digital media stream representing media content such as video and/or audio content and to output the media content and/or forward the stream for presentation of the content on a user interface such as a display screen and/or an audio speaker. Examples of such clients include televisions, computer monitors, projection systems, loudspeakers, headphones, set top boxes (e.g. cable or satellite TV receivers), digital video recorders, radios, personal computers, mobile communication devices, gaming consoles, streaming media players, and the like.

By way of example, a television could receive a broadcast stream (e.g., over the air, from a set top box, through an Internet connection, or in another manner) and could present the media content of that broadcast stream to a user. As another example, a set top box could receive a broadcast stream from a multi-channel video program distributor (MVPD) and could output the media content of that stream via a High-Definition Multimedia Interface (HDMI) cable or other interface to a television and/or audio/video receiver for playout. As still another example, a digital video or audio recorder could likewise receive a broadcast stream but could store the broadcast stream for later playout. And as yet another example a loudspeaker or headphones could receive a broadcast audio stream from a radio, computer, or other device, and could present the audio content of that stream to a user. Numerous other examples are possible as well.

SUMMARY

The present disclosure provides for use of watermarking in a media stream as a trigger for carrying out a fingerprint-related action, such as an action related to fingerprinting of the media stream. By way of example, a watermark in a media stream could cause a recipient media client to begin generating digital fingerprints of the media stream, perhaps to facilitate fingerprint-based automatic content recognition (ACR) of the media in order to allow dynamic content revision or the like. As another example, a watermark in a media stream could cause a recipient media client to increase a rate at which the media client generates digital fingerprints of the media stream, also perhaps to facilitate dynamic content revision. And as yet another example, a watermark in a media stream could cause a recipient media client to begin reporting to a server or other entity digital fingerprints of the media stream that the media client generates.

In an example implementation, as the media client receives, outputs, or otherwise processes the media stream for presentation (e.g., when the media client is transcoding and/or rendering each frame of the media content to facilitate presentation of the content on user interface, and/or is otherwise processing the ongoing media stream), the media client could itself detect in the media stream the watermark and could then respond to the detected watermark by taking the fingerprint-related action. Alternatively, an entity in a media-distribution path over which the media stream flows to the media client could detect the watermark in the media stream and could responsively signal to the media client (e.g., through out-of-band messaging) to cause the media client to carry out the fingerprint-related action.

Further, the watermark that is included in the media stream and that triggers the fingerprint-related action could be added to the media stream by a content source, content distributor, or other entity, to facilitate the presently disclosed functionality. In an example implementation, for instance, the entity might insert the watermark in response to detecting in-band metadata in a transport stream that carries the media stream along the media-distribution path. For instance, the entity might read the metadata from the transport stream and might responsively then encode the metadata expressly or by reference in a watermark in the media stream, so that when the media client receives the media stream, the media client could extract the metadata from the watermark. And the watermark-extracted metadata could cause the media client to carry out a fingerprint-related action.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
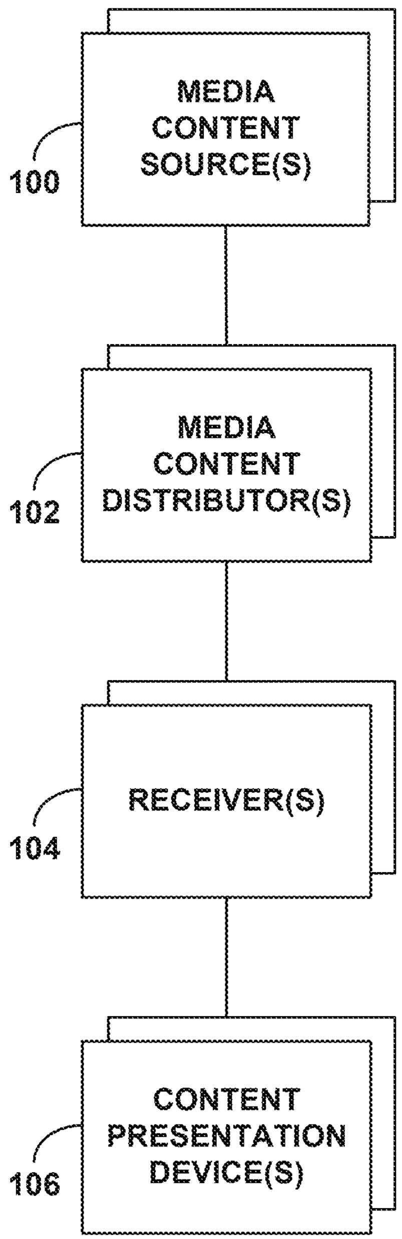
FIG. 1 is a simplified block diagram of an example system in which various disclosed principles can be applied.

Referring to the drawings, as noted above, FIG. 1 is a simplified block diagram of an example system in which various disclosed principles can be applied. It will be understood, however, that this and other arrangements and processes described herein can take various other forms. For instance, elements and operations can be re-ordered, distributed, replicated, combined, omitted, added, or otherwise modified. Further, it will be understood that functions described herein as being carried out by one or more entities could be implemented by and/or on behalf of those entities, through hardware, firmware, and/or software, such as by one or more processing units executing program instructions or the like.

As shown in FIG. 1, the example system includes one or more media content sources 100 (e.g., broadcasters, web servers, etc.), one or more media content distributors 102 (e.g., MVPDs, such as cable providers, satellite providers, over-the-air broadcast providers, web aggregators, etc.), one or more media content receivers 104 (e.g., cable receivers, satellite receivers, over-the-air broadcast receivers, computers or other streaming media receivers, etc.), and one or more clients or content presentation devices 106 (e.g., TVs or other display devices, loudspeakers or other audio output devices, etc.)

In an example implementation, the media content sources 100 could be national broadcasters, such as ABC, NBC, CBS, FOX, HBO, and CNN, the media content distributors 102 could be local affiliates and/or other local content distributors in designated market areas (DMAs), and the receivers 104 and content presentation devices 18 could then be situated at customer premises, such as homes or business establishments. With this or other arrangements, the content sources 100 could deliver media content to the content distributors 102 for distribution to receivers 104 at customer premises, and the content distributors could distribute the media content to the receivers 104 on discrete channels (e.g., particular frequencies or other defined channels). Each receiver could then respond to user input or one or more other triggers by tuning to a selected channel and outputting to a content presentation device 106 the media content that is arriving on the selected channel. And the content presentation device 106 could receive and render the media content (e.g., display or otherwise present the content).

1. Dynamic Content Modification

When a media client such as a receiver 104 or content presentation device 106 is outputting media content of a linear media stream for presentation to a user, it may be useful in certain situations for the media client to revise a portion of the stream's media content. For example, it may be useful for the media client to dynamically replace an ad or other segment of the media content with a replacement ad or with other replacement content, so that when the content is played out to a user, the user would receive the replacement ad in place of the originally included ad. As another example, it may be useful for the media client to dynamically supplement a portion of the media content with overlay or split-screen content, such as channel identification, context information, ad content, or the like, so that when the content is being played out to a user, the user would receive the supplemental content together with the originally included content.

Further, it may be desirable for the media client to perform such content revision at a specific time point within the media stream. For instance, if the media client is to dynamically replace an existing ad with a replacement ad, it may be desirable for the media client to position the replacement ad at a time in the media stream when the existing ad would have started. Likewise, if the media client is to supplement a specific portion of the media content with an overlay related to that portion, it may be desirable for the media client to start the overlay when that portion starts. Other examples are possible as well.

More particularly, the media stream at issue could define a sequence of frames, such as video frames and/or audio frames, and it may be desirable for the media client to perform the content revision on a frame-accurate basis. For instance, for dynamic content replacement, it may be desirable for the media client to insert the replacement content in place of the existing ad starting precisely at the first frame of the existing content segment. And for adding an overlay to a specific portion of the media stream, it may be desirable for the media client to start the overlay at or in specific relation to the first frame of that portion of the media stream.

To facilitate dynamic content revision, fingerprint-based ACR could be used in order to detect the presence of a modifiable-content segment (e.g., a segment that could be replaced or otherwise modified) in the media stream being processed by the client or to detect the presence of content that precedes that modifiable-content segment in the media stream being processed by the client. The media client could then proceed with the dynamic content modification with respect to that modifiable-content segment.

Figure 2:
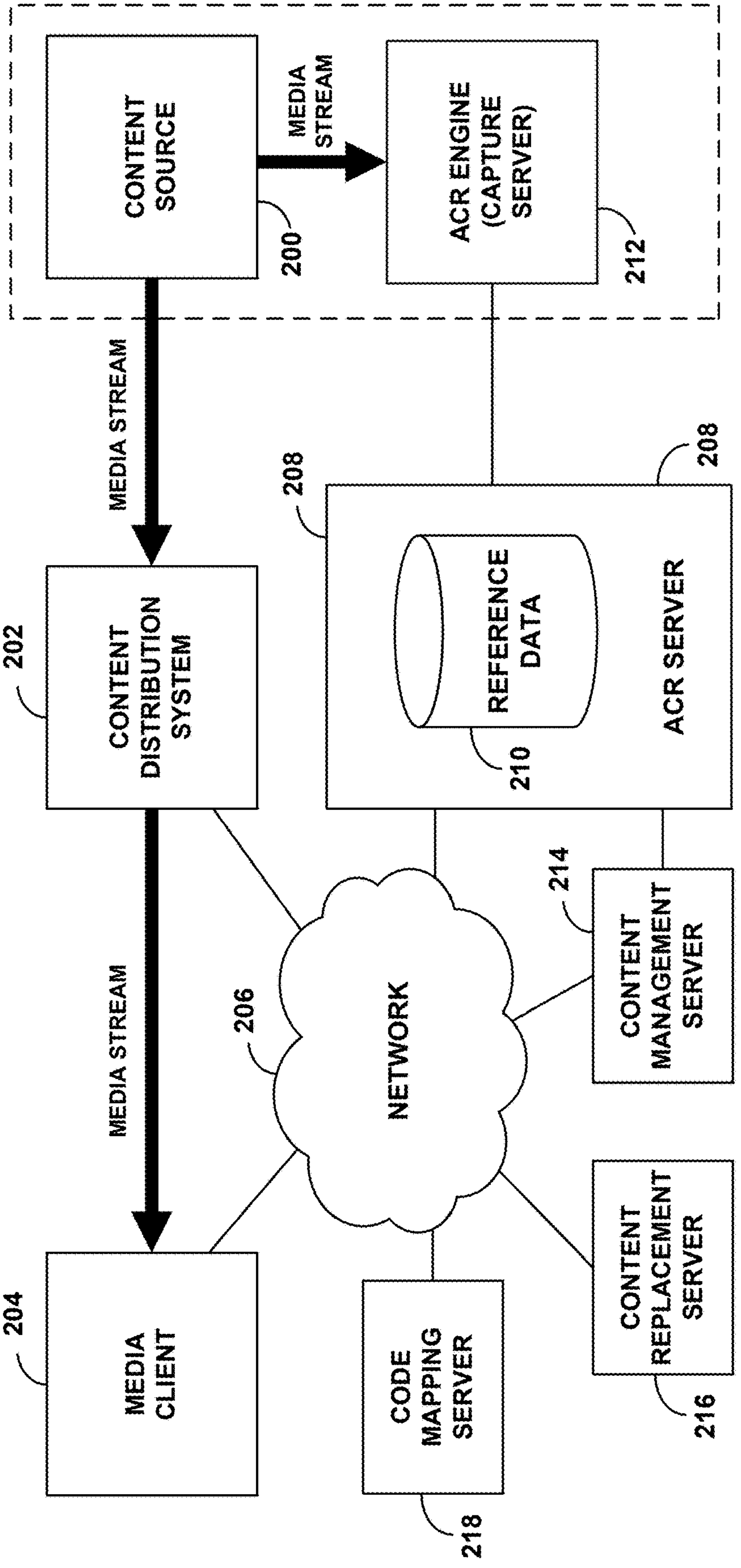
FIG. 2 is another simplified block diagram of an example system in which various disclosed principles can be applied.

FIG. 2 is a simplified block diagram of an example system in which fingerprint-based ACR could be used for this purpose.

FIG. 2 shows at its top an example media-distribution path extending from a content source 200 to a media client 204 via a content distribution system 202. Without limitation, for instance, the content source 200 could be a national broadcaster such as one of those noted above, the content distribution system 202 could be an MVPD such as a local affiliate of the national broadcaster, and the media client 204 could be a content presentation device such as a TV or the like, or a receiver such as a set top box or the like.

With this arrangement, an example media stream flows over the media-distribution path from the content source 200 to the content distribution system 202 and then from the content distribution system 202 to the media client 204. Without limitation, this media stream could comprise and thus define a sequence of digital frames of media content as noted above, perhaps representing a specific channel of content. The content source 200 could convey this media stream to the content distribution system 202 in a packet-based transport stream, by conveying segments of the media stream in payload of transport-stream packets to the content distribution system 202. And the content distribution system 202 could then forward the media stream, possibly also in a packet-based transport stream or possibly de-packetized and/or transcoded, to the media client 204 for processing, to facilitate presentation of the media content.

As further shown, the example system includes an ACR server 208, with which the media client 204 could engage in out-of-band communication, such as Internet Protocol (IP) signaling through a representative packet-switched network 206 for instance. The ACR server 208 could be configured to engage in various ACR operations, such as automatically determining an identity of the media stream (e.g., the channel) being processed by the media client 204 and automatically detecting in that media stream an upcoming content-modification opportunity, such as an upcoming ad-replacement opportunity for instance.

To facilitate these or other such ACR operations, the ACR server 208 could be provisioned with reference data 210 including digital reference fingerprints of each of various media streams and digital reference fingerprints of each of various modifiable-content segments, such as replaceable ads, that might appear in a given media stream. This reference data 210 could be supplied by the content source 200 and by a content management server 214, among other possibilities.

For instance, as the content source 200 outputs each of various media streams including the media stream shown in the figure, an ACR engine 212 operating as a capture server at the content source 200 could generate timestamped digital reference fingerprints, on a per-frame basis or other ongoing basis, respectively representing the media stream. And the ACR engine 212 could provide those reference fingerprints to the ACR server 208, associating the reference fingerprints of each media stream with an identity of that media stream. The ACR server 208 could thus store those timestamped digital reference fingerprints along with the associated media-stream identity information as part of the reference data 210. (Alternatively, the reference-fingerprint generation could be done at the content distribution system 202, among other possibilities.)

Further, in accordance with agreements to facilitate dynamic content modification such as dynamic ad replacement for instance, the content management server 214 could receive copies of each of one or more modifiable content segments, such as one or more replaceable ads, and the content management server 214 could generate digital fingerprints representing each such modifiable content segment and could provide those digital fingerprints to the ACR server 208. And the ACR server 208 could thus store those digital fingerprints of the modifiable-content segments as part of the reference data 210 as well.

Without limitation, an example digital fingerprinting process with respect to video could apply on a per video frame basis and could involve establishing a representation of luminosity and/or other video characteristics. For instance, for a given video frame, a fingerprint generator could programmatically divide the frame into a grid, and the fingerprint generator could measure luminosity of the frame per grid cell and generate a bit string with each bit or series of bits representing luminosity of a respective grid cell, or representing a weighted difference between the luminosity of certain defined pairs of the grid cells, or the like. Further, the fingerprint generator could apply this process continually to generate the digital fingerprint over time as a sequence of fingerprints (e.g., as a fingerprint stream). For instance, the fingerprint generator could apply this process to each frame, to each key frame, periodically, or on another defined basis, with each frame's bit string defining a digital fingerprint and/or with a specified hash, combination or series of such bit strings or other representative values defining a digital fingerprint, on a sliding window basis. Other digital fingerprinting processes could be used as well, further including audio fingerprinting processes.

As the media client receives and/or otherwise processes the ongoing media stream, the media client could likewise generate query digital fingerprints representing frames of the media content of the stream, to facilitate ACR. The media client could apply the same digital fingerprinting process that is used to generate the reference fingerprints of the media streams and modifiable-content segments, so as to allow a comparison of the query fingerprints with those reference fingerprints for purposes of ACR and to facilitate dynamic content revision for instance.

In an example implementation, the media client could periodically (or otherwise from time to time) transmit over the network to the ACR server a latest set of the query fingerprints that the media client has generated, to enable the ACR server to identify the media stream that the media client is processing. As the ACR server receives these query fingerprints from the media client, the ACR server could compare the query fingerprints with the media-stream reference fingerprints stored by the ACR server, and upon finding with sufficient certainty that the query fingerprints match the reference fingerprints associated with a specific media stream (e.g., a specific channel), the ACR server could conclude that that is the channel being processed by the media client.

To compare a given query fingerprint with a given reference fingerprint, the ACR server could compare corresponding portions of the fingerprints with each other to determine whether the portions match exactly or within defined tolerances. For example, the ACR server could compute a maximum deviation between the fingerprints and determine if the maximum deviation is within a predefined tolerance. Further, if the fingerprints are binary, this could be a Boolean determination or could involve computing a Hamming distance (as a count of mismatches between respective bit locations in the fingerprints), and if the fingerprints are more complex values, such as decimal values or vectors (e.g., grey values per video frame region), this could involve determining a distance between the values or vectors. Other examples are possible as well.

Once the ACR server has identified the media stream being processed by the media client, the ACR server could use that media-stream identity as a basis to facilitate dynamic content revision, such as dynamic ad replacement, in the media stream. For instance, given the identity of the media stream, the ACR server could start comparing the reference fingerprints specifically of that media stream with the modifiable-content-segment fingerprints, in order to detect the presence of a particular modifiable-content segment in the media stream that is being processed by the media client. And upon detecting the presence of a modifiable-content segment in the media stream being processed by the media client, the ACR server could then engage in out-of-band signaling (e.g., over network 206) with the media client to prepare the media client to engage in dynamic replacement of that particular replaceable-ad by the time the modifiable content segment arrives at the media client for processing. This signaling to and preparation of the media client could take advantage of a time delay that is likely to exist in transmission of the media stream from the content source to the media client. Depending on the configuration of the system, that delay could be on the order of 5-10 seconds.

To prepare the media client to carry out the dynamic content revision, for instance, the ACR server could transmit to the media client a set of reference fingerprints that represent frames of the media stream for a period of time approaching and perhaps including the modifiable-content segment in the media stream, and with an indication of the media-stream frame where the modifiable-content segment starts. The media client could then itself engage in fingerprint comparison, comparing its generated query fingerprints with the provided reference fingerprints in order to detect the approach of and/or start of the modifiable-content segment in the media stream that the media client is processing. And the media client could then engage in the dynamic content revision starting at the point the modifiable-content segment starts.

Further, the ACR server could also provide the media client with other information to facilitate the dynamic content revision. For instance, the ACR server could provide the media client with an address (e.g., universal resource locator (URL)) or other information that enables the media client to obtain from a content replacement server 216, from local data storage of the media client, or from another location, a replacement content segment, such as a replacement ad, that the media client should insert in place of the modifiable-content segment, and with duration and other information to enable the media client to obtain a suitable replacement content segment for this purpose. The media client could thus obtain a replacement content segment and could accordingly insert the replacement content segment in place of the modifiable-content segment as the media client processes the ongoing media stream.

Numerous variations and alternatives to this process may be possible as well.

For example, the ACR server could learn in another manner the identity of the media stream being processed by the media client. For instance, the media client may have information that identifies the media stream being processed by the media client, and the media client may transmit that information to the ACR server to more directly inform the ACR server of the identity of the media stream. The ACR server could then use that identity as noted above, for instance, to then detect presence in the media stream of a modifiable-content segment and to responsively prepare the media client to engage in dynamic content revision with respect to that segment.

As another example, even possibly without identifying the media stream in the first place, the media client and/or ACR server could engage in fingerprint analysis to identify the presence of a modifiable-content segment in the media stream being processed by the media client. For instance, as the media client is processing the ongoing media stream, the media client could generate query fingerprints representing the media content of the media stream as noted above, and the media client and/or the ACR server could compare those query fingerprints with the modifiable-content-segment fingerprints in an effort to find a match that would establish the presence of the modifiable-content segment in the media stream being processed by the media client.

In one implementation, for instance, the ACR server, content management server, or other entity could provision the media client with modifiable-content-segment fingerprints representing one or more replaceable ads, such as by transmitting the modifiable-content-segment fingerprints over network 206 to the media client for storage and reference. As the media client is processing the ongoing media stream, the media client could thus compare its generated query fingerprints with those modifiable-content-segment fingerprints in an effort to find a match. And upon finding with sufficient certainty that the query fingerprints match the fingerprints of a given modifiable-content segment, the media client could thus conclude that that modifiable-content segment is present in the media stream being processed by the media client. Depending on timing, the media client may then be able to dynamically replace that modifiable-content segment with a replacement content segment.

And in another implementation, the media client could transmit to the ACR server the query fingerprints that the media client generates, and the ACR server could compare those query fingerprints with the fingerprints of one or more modifiable content segments. In that case, upon finding with sufficient certainty that the query fingerprints match the fingerprints of a given modifiable-content segment, the ACR server could conclude that that modifiable-content segment is present in the media stream being processed by the media client. And the ACR server may then be able to inform the media client of the presence of the modifiable-content segment in the media stream being processed by the media client, and, similarly depending on timing, the media client may then be able to dynamically replace that modifiable-content segment with a replacement content segment.

Other example variations are possible as well, including possibly other types and processes of dynamic content revision.

2. Use of Watermarking in a Media Stream to Trigger Fingerprint-Related Action

As noted above, the present disclosure provides for use of watermarking in a media stream as a basis to trigger fingerprint-related action. In a representative implementation, the media stream that flows to the media client could include a watermark (e.g., one or more watermarks) that the media client could detect and interpret as a trigger for the media client to engage in a fingerprint-related action. Thus, as a result of the watermark in the media stream, the media client could engage in a fingerprint-related action. The fingerprint-related action could be a fingerprint-ACR-related action, possibly related to dynamic content revision, or it could take other forms.

Without limitation, various examples of this could apply in the arrangement of FIG. 2 or in other contexts.

As one example, the fingerprint-related action could comprise starting to generate query fingerprints of the media stream that is being processed by the media client, in order to facilitate comparison of the query fingerprints with other fingerprints, such as to identify the media stream and/or to detect particular media content, such as a modifiable-content segment, in the media stream.

For instance, the media client may not regularly be generating query fingerprints as the media client is processing the ongoing media stream. But as the media client is processing the ongoing media stream, the media client could detect in the media stream a watermark indicating that a content-modification opportunity is approaching, and in response to detecting that watermark, the media client could then start generating query fingerprints of the media stream, to facilitate any of the above-noted comparisons of the query fingerprints, among other possibilities.

In an implementation of this process, the watermark in the media stream could encode information that is interpretable by the media client to mean that a modifiable-content segment, such as a replaceable ad, will appear later in the media stream. This watermark could be provided in the media stream sufficiently in advance of the point where the modifiable-content segment would be present in the media stream, so as to allow enough time for the media client to begin generating the query fingerprints and for use of the generated query fingerprints as a basis to detect the approach or presence of the modifiable-content segment, so as to facilitate dynamic content revision. Using a watermark as a trigger for the media client starting to generate query fingerprints might serve other useful purposes as well, not limited to facilitating dynamic content modification.

As another example, the fingerprint-related action could comprise increasing a rate at which the media client generates query fingerprints of the media stream being processed by the media client, so as to facilitate more granular fingerprint analysis and possibly more frame-accurate content revision or other functionality.

In practice, the ongoing media stream at issue might be a video stream having 30 frames per second. But due to resource limitations at the media client (e.g., limitations on processing power, memory, or the like), the media client may regularly generate query fingerprints at a relatively low rate, such as only 2 frames per second (e.g., generating query fingerprints of just 2 frames of the media stream every second). On the other hand, reference fingerprints representing known media streams or representing known modifiable-content segments such as replaceable ads might be generated at a relatively high rate, perhaps 30 frames per second. At certain times, it may be useful to increase the media client's query-fingerprint-generation rate to help facilitate a more granular comparison of the query fingerprints with such reference fingerprints, among other possibilities.

In an implementation of this example, a watermark in the media stream could encode information that is interpretable by the media client to cause the media client to increase its query-fingerprint-generation rate. For example, here again, the watermark might be interpretable to mean that a modifiable-content segment will appear later in the media stream, as an example situation where it may be useful for the media client to increase its query-fingerprint-generation rate, and the watermark could be provided in the media stream sufficiently in advance of the point where the modifiable-content segment would be present. In response to such a watermark, the media client could thus increase its query-fingerprint-generation rate, in order to help facilitate a more time-granular fingerprint comparison, such as to facilitate detecting the approach or presence in the media stream of a modifiable-content segment in order to facilitate dynamic content revision. For instance, the media client might increase its query-fingerprint-generation rate from 2 frames per second up to 8 frames per second, among other possibilities.

As yet another example, the fingerprint-related action could comprise starting to report fingerprints to a server or other entity to facilitate fingerprint comparison or other action. For instance, the media client might not normally be reporting query fingerprints to the ACR server. But as the media client is processing the ongoing media stream, the media client could detect in the media stream a watermark that encodes information interpretable by the media client to cause the media client to start reporting query fingerprints to the ACR server. Thus, in response to that watermark, the media client could start reporting query fingerprints to the ACR server. Further, if the media client is not already generating query fingerprints, such a watermark could be interpretable by the media client to cause the media client to start generating the query fingerprints and to start reporting the generated query fingerprints to the ACR server. These query fingerprints could then facilitate various operations, such as those discussed above, among other possibilities.

Still further, as another example, the fingerprint-related action could comprise engaging in signaling to obtain reference fingerprints so as to facilitate local fingerprint comparison. By way of example, a watermark in the media stream could be interpretable by the media client to cause the media client to request the ACR server to provide the media client with reference fingerprints that the media client could compare with its generated query fingerprints in any of the ways discussed above, among other possibilities. Thus, upon detecting the watermark in the ongoing media stream, the media client could responsively query the ACR server to obtain the reference fingerprints. And upon obtaining the reference fingerprints in response from the ACR server, the media client could make use of the reference fingerprints in any of the ways discussed above, among other possibilities.

As a specific implementation of this example, the watermark could encode an ad-identifier of a particular ad. The media client could thus obtain that ad-identifier from the watermark in the media stream and could send the ad-identifier to the ACR server. And the ACR server could use that ad-identifier as a basis to provide the media client, in response, with fingerprints of that particular ad (or an initial portion thereof) and/or of media content that would precede that ad in the media stream being processed by the media client. As discussed above, the media client could then use these provided fingerprints as a basis to validate that the identified ad appears within the media stream and/or to identify (and/or confirm) a time at which the ad begins in the media stream. The media client could then proceed with dynamic ad replacement with respect to that ad at the time so identified or confirmed.

Yet further, as another example, the fingerprint-related action could comprise engaging in fingerprint comparison. For instance, a watermark in the media stream could be interpretable by the media client to cause the media client to start comparing its generated query fingerprints with various reference fingerprints. Here, for instance, the watermark might cause the media client to both obtain reference fingerprints to facilitate the comparison, if the media client does not already have the applicable reference fingerprints, and to also engage in the fingerprint comparison with respect to those reference fingerprints or other fingerprints, perhaps to facilitate the validation or identification noted above, among other possibilities.

And as a specific implementation of this example, the fingerprint-related action that results from detecting the watermark in the media stream could be comparing of query fingerprints of the media stream with reference fingerprints representing that media stream. For instance, during ad replacement or other content modification, the media client could engage in this fingerprint comparison to determine and verify that the content being replaced or otherwise being modified continues to be the content of the same media stream that was identified as the media stream being processed by the media client.

The media client could generate query fingerprints of the underlying media stream even while the media client engages in the content modification, and the media client could compare those query fingerprints with reference fingerprints provided by the ACR server representing the media stream that the media client has been processing. Or the media client could send those query fingerprints to the ACR server to enable the ACR server to perform such comparisons.

In either case, if, during the content modification (or other interactive event), the query fingerprints stop matching reference fingerprints representing expected upcoming content of the media stream, then the media client could responsively stop the content modification. This could happen in a situation where, for example, a user of the media client has changed a channel or provided inputs so as to initiate a user interface feature (such as a menu, guide, etc.) Therefore, once the query fingerprints stop matching reference fingerprints of the expected upcoming content (e.g., a modifiable-content segment as to which presenting in its place a replacement content segment was determined to be acceptable), the media client and/or ACR server could cause the content modification to be terminated such that the media client would revert to playing back the content that was being modified.

As these examples illustrate, the watermark that is included in the media stream according to the present disclosure may, but need not, indicate that an upcoming content-modification opportunity is approaching. The watermark may encode other data or information that operates as a trigger for the fingerprint-related action. Further, the fingerprint-related action could take forms other than those described here.

In a representative implementation, the watermark that is included in the media stream could be a code or other value that represents any of a variety of information. Without limitation, for instance, the information could include (i) an identifier of a particular upcoming content-modification opportunity (e.g., an ad-ID of an upcoming replaceable-ad), (ii) a timing at which an upcoming modifiable-content segment will begin within the media stream (e.g., a time offset, a reference time stamp, and/or a frame offset), and/or (iii) an indication of a network resource for the media client to contact for additional resources (e.g., an instruction and/or address, to enable and/or cause the media client to contact a server).

In practice, as the media client processes the ongoing media stream, the media client could monitor the media stream in an effort to detect such a watermark, perhaps based on the watermark having a predefined form or position indicative of it being a watermark. And upon detecting the watermark, the media client could decode the watermark to extract the information encoded by the watermark. The media client could then respond to the extracted information as discussed above for instance.

The information that is encoded by the watermark could be expressly interpretable by the media client to cause the media client to carry out or cause to be carried out a fingerprint-related action. For instance, the watermark could encode a code that program logic at the media client could map to the associated fingerprint-related action, and so the media client could apply that program logic to determine from the code extracted from the watermark the action that the media client should carry out, and the media client could accordingly carry out that action.

Alternatively, the information that is encoded by the watermark could enable the media client to query a server or other entity to determine the action that the media client is to carry out. For instance, the watermark could encode a code that a code-mapping server 218, the ACR server, or another entity maps to an action that the media client should carry out. Thus, upon extracting the code from the watermark in the media stream being processed, the media client could then query the code-mapping server, ACR server, or other entity to determine the action that the media client should carry out. And that entity could responsively instruct the media client, based on the watermark-extracted code, to carry out a particular action, such as (i) starting to generate query fingerprints, (ii) increasing the media client's query-fingerprint-generation rate, (iii) reporting query fingerprints, and/or (iv) engaging in other processing, possibly related to an upcoming dynamic content modification to the like.

In an alternative implementation, rather than or in addition to the media client detecting and decoding the watermark in the media stream and responsively carrying out or causing to be carried out the fingerprint-related action, another entity could perform either or both of these operations, possibly working together with the media client.

Without limitation, for instance, another entity in the media-distribution path along which the media stream flows to the media client could detect the watermark in the media stream and, based on the watermark, could carry out or cause to be carried out a fingerprint-related action. For instance, a capture server, channel monitor, fingerprint server, or other entity that operates at a source or intermediary within the media-distribution path, such as in a broadcaster's headend, or elsewhere in the media-stream distribution path, could monitor the media stream in an effort to detect presence of the watermark that could trigger the fingerprint-related action. And upon detecting the watermark, the entity could responsively carry out or cause to be carried out a fingerprint-related action.

In an implementation of this example, upon detecting the watermark, the entity could transmit the watermark payload (e.g., information encoded by the watermark or determined by reference from the watermark) or an associated action-instruction directly or indirectly (e.g., in out-of-band signaling) to each of one or more media clients that are or may be currently processing that media stream, to enable and/or cause each such media client to carry out a fingerprint-related action such as one of the actions noted above.

For instance, the entity could transmit the watermark payload and/or associated instructions as metadata to the ACR server, and the ACR server could in turn convey to the media client that information together with fingerprints (e.g., reference fingerprints) that the ACR server is providing to the media client to facilitate local fingerprint analysis, so that the media client would receive the detected watermark payload when receiving the fingerprints. Alternatively, the entity could otherwise transmit the watermark payload and/or associated instructions through out-of-band signaling to the media client, perhaps over network 206, and perhaps including timestamp data to facilitate synchronization with the media stream being received by the media client.

Detecting and extracting watermark payload at the broadcast headend or other intermediary in the media-distribution path could help to mitigate against any attempt to destroy or mask the watermark before it reaches the media client. Further, upon receipt of the watermark payload and/or instructions derived from the watermark payload, and thus still in response to the watermark, the media client could just as well responsively carry out, or cause to be carried out, a fingerprint-related action.

As is known in the art, watermarking involves permanently embedding or otherwise encoding information into media content in a manner that enables the information to be decoded and extracted from the media content by a receiver of the media content but that may be imperceptible to a user to whom the media content is presented. This is in contrast to inserting such information into a packet header or the like without encoding the information into the underlying media content itself. Watermarking permanently changes the media content and may be impossible to remove.

More particularly, watermarking media content could involve encoding into the media content a code that can be mapped to associated information, or perhaps more directly encoding into the media content the associated information. In an example implementation, the watermark code could be on the order of 24 bits, and the watermarking could be done in an audio component of the media content and/or in a video component of the media content, depending on the form of the media content for instance.

Existing audio watermarking techniques include, without limitation, inserting audio energy into the audio signal or otherwise adjusting one or more characteristics of the audio signal in a manner that can be detected by a suitably configured watermark-detection algorithm but that is masked from hearing (e.g., the audio characteristic and/or manner of encoding being sufficient to hide the watermark from human detection)—known as stenographic or psychoacoustic encoding.

Examples of audio watermarks and corresponding watermark detection techniques are described in U.S. Pat. No. 8,359,205 (entitled "Methods and Apparatus to Perform Audio Watermarking and Watermark Detection and Extraction," which issued on Jan. 22, 2013), U.S. Pat. No. 8,369,972 (entitled "Methods and Apparatus to Perform Audio Watermarking Detection and Extraction," which issued on Feb. 5, 2013), U.S. Patent Application Pub. No. 2010/

0223062 (entitled "Methods and Apparatus to Perform Audio Watermarking and Watermark Detection and Extraction," which was published on Sep. 2, 2010), U.S. Pat. No. 6,871,180 (entitled "Decoding of Information in Audio Signals," which issued on Mar. 22, 2005), U.S. Pat. No. 5,764,763 (entitled "Apparatus and Methods for Including Codes in Audio Signals and Decoding," which issued on Jun. 9, 1998), U.S. Pat. No. 5,574,962 (entitled "Method and Apparatus for Automatically Identifying a Program Including a Sound Signal," which issued on Nov. 12, 1996), U.S. Pat. No. 5,581,800 (entitled "Method and Apparatus for Automatically Identifying a Program Including a Sound Signal," which issued on Dec. 3, 1996), U.S. Pat. No. 5,787,334 (entitled "Method and Apparatus for Automatically Identifying a Program Including a Sound Signal," which issued on Jul. 28, 1998), and U.S. Pat. No. 5,450,490 (entitled "Apparatus and Methods for Including Codes in Audio Signals and Decoding," which issued on Sep. 12, 1995, all of which are hereby incorporated by reference in their entireties.

Existing video watermarking techniques, on the other hand, involve embedding a code in a video component of the media content in a manner that can be detected by a suitably configured watermark-detection algorithm but that is masked from human visual detection.

Examples of video watermarking techniques include various spatial-domain techniques such as flipping pixels, embedding the watermark into least significant bits, and adding a pseudo-random noise pattern to the video, and various frequency-domain techniques, such as SVD domain watermarking, Discrete Fourier Transform watermarking, Discrete Cosine Transform watermarking, Discrete Wavelet Transform watermarking, and principal component analysis watermarking. Other examples are possible as well.

Any of these or other watermarking techniques could be used for present purposes or otherwise for watermarking in a manner that could facilitate the features presently disclosed.

3. Watermarking Media Content Based on Transport-Stream Metadata

In an example implementation of the above process, any of a variety of entities could encode the watermark into the media stream in the first place. For instance, the content source 200 or other originator of the media stream could watermark the media stream before outputting the media stream for delivery to one or more content distribution systems. Alternatively, an intermediary in the media-distribution path could add the watermark into the media stream as the media stream is en route ultimately to the media client.

Further, the entity that encodes the watermark into the media stream could determine in various ways the information to be represented by the watermark, i.e., the information that the entity will watermark into the media stream.

In one example implementation, if the entity is going to watermark into the media stream information about an upcoming content-modification opportunity (e.g., upcoming ad-replacement opportunity) as discussed above, the entity might determine information about the upcoming content-modification opportunity from a fingerprint analysis of the media stream that is en route to the media client.

For instance, the entity or an associated entity in the media-distribution path might regularly compare reference fingerprints of the media stream with fingerprints of modifiable content segments such as replaceable ads. And upon finding a match with sufficient certainty, the entity might thereby implicitly have determined the timing of the content modification to be the time when that modifiable content segment begins in the media stream. Further, the entity might refer to reference data to ascertain other associated information regarding the upcoming content modification. And the entity might then watermark into the media stream various such ascertained data, so that the media client receiving the media stream could determine the information from the watermarking and could then accordingly plan for and carry out the dynamic content modification.

Alternatively, another way for an entity to ascertain some or all of the information to be watermarked into the media stream is based on metadata carried in a transport stream that also carries the media stream. In particular, the entity or another associated entity might read from the transport stream certain metadata that indicates some or all of the information, and the entity might then watermark into the media stream (expressly or by reference) that information and/or information derived from that information.

In practice, when a media stream is being transmitted directly or indirectly from one entity to another in a representative media distribution system, it may be useful to convey various metadata together with the media stream, for receipt and use of the metadata by the downstream entity.

Without limitation, for instance, when a national TV broadcaster delivers a broadcast stream to an MVPD for transmission by the MVPD to various end-user TV reception devices, it may be useful for the national broadcaster to convey with the broadcast stream certain metadata that could facilitate action by the MVPD. And as another example, when a national TV broadcaster and/or MVPD delivers a media stream directly or indirectly to a customer-premises receiver such as a set top box or the like serving an end-user TV, it may be useful for the broadcaster or MVPD to include with the media stream certain metadata that could facilitate action by the customer-premises receiver.

Conveying metadata together with a media stream being delivered from one entity to another could facilitate various types of actions by the downstream entity. Without limitation, for instance, metadata that is related to an upcoming content-modification opportunity in the media stream could facilitate dynamic revision of the media stream by the downstream entity, whether that downstream entity is the media client or another entity in the media-distribution path. By way of example, it may be useful for any downstream entity to dynamically replace an ad or other segment of the media stream with a replacement ad or other replacement content, perhaps to help tailor the media content to a particular market, consumer, or the like. Further, it may be desirable to perform such content revision at a specific time point within the media stream. For instance, if an existing ad is going to be replaced with a replacement ad, it may be desirable to position the replacement ad at a specific time in the media stream when the existing ad would have started To facilitate this, an entity that delivers the media stream could include together with the media stream certain information related to the upcoming content-modification opportunity, such as information specifying timing of the upcoming content-modification opportunity and/or information characterizing the type of content modification to perform, among other possibilities. When the downstream entity receives the media stream together with the metadata, the downstream entity could then use the metadata as a basis to carry out, or cause to be carried out, the dynamic content revision.

One way to convey such metadata together with a media stream is to include the metadata in-band within a transport stream that carries the media stream. Namely, the transport stream could separately carry (i) the media stream and (ii) the metadata.

For example, if the media stream is conveyed as payload within a sequence of transport packets (e.g., Internet Protocol packets or the like), the metadata could be conveyed within a header of each of one or more of the transport packets. Upon receipt of each such transport packet, a downstream entity could then not only receive payload representing a portion of the media stream but could also receive the metadata from the packet header. Alternatively, one or more special packets in the transport stream could carry the metadata within a header or payload portion. As the downstream entity receives the sequence of transport packets providing the media stream, the downstream entity could then receive the metadata from each special packet. In either case, the downstream entity could then use the received metadata as a basis to carry out a useful action, such as an action with respect to the media stream.

Example transport stream protocols that could be used to carry metadata include those defined by standards organizations such as the Society of Cable and Telecommunications Engineers (SCTE) and the Advanced Television Systems Committee (ATSC).

For instance, the SCTE has created standards that define a method for seamlessly splicing different segments of digital content into a packet-based transport stream such as a broadcast program stream. These standards provide for including within a transport stream special SCTE triggers that designate time points in the media stream where splicing is to occur, and for having an entity in the media distribution chain detect the presence of such a SCTE trigger and responsively carry out splicing at the indicated time point.

More particularly, the SCTE's Digital Program Insertion (DPI) standard provides for including within a packet-based transport stream special "splice_information" packets that specify time points where splicing is to occur in the stream. Further, the standard provides that such a packet could designate an "out" time point where an entity is to splice away from the transport stream to other content, or an "in" time point where the entity is to splice back to the transport stream from other content (or alternatively a break duration defining how long the content replacement should last). Splice_information packets could carry this and other information in XML (fully parsed, or as a binary representation).

Thus, to enable time accurate replacement of a segment of a media stream carried by a packet-based transport stream, a provider of the transport stream could insert a SCTE splice_information packet that designates an out time point at the start of the media segment and could further insert a splice_information packet that designates an in time point at the end of the media segment. And an entity downstream in the media-distribution path could then detect the presence of those splice_information packets and could responsively splice in replacement content starting at the out-point and ending at the in-point.

In a representative implementation of this process, a national broadcaster could provide a packet-based transport stream that carries media stream including core program content and additionally including a commercial break defining a national ad. Further, per agreements with MVPDs, the national broadcaster could permit each MVPD to replace the included national ad with a local ad specific to the MVPD's market area. To facilitate this, the national broadcaster could insert into the transport stream one or more splice_information packets that designate when the local ad replacement is to start and end.

Thus, upon receipt of the national transport-stream feed, an MVPD could detect and read the splice_information packet(s) and could thereby determine the specific time in the media stream when the MVPD is to insert a replacement local ad. At the determined time, the MVPD could then splice a replacement local ad into the media stream, so as to produce a modified media stream. And the MVPD could transmit the modified media stream to one or more end-user TV reception devices for playout.

The ATSC has also developed one or more standards that enable conveying of metadata in-band within a transport stream that carries a media stream from one entity to another. A recent example of such a standard is ATSC 3.0.

Although conveying metadata in-band within a transport stream that also carries a media stream could work well in practice, that process may have some downsides.

One technical issue with the process is that, as a media stream is en route to a downstream entity such as ultimately to a media client as discussed above, the metadata that is carried in the transport stream may be discarded or otherwise not conveyed together with the media stream to the downstream entity. This could happen in various ways.

By way of example, an entity within the media-distribution path might receive the transport stream that carries the media stream and the metadata and might strip the metadata from the transport stream before forwarding the transport stream along the media-distribution path, so that a downstream entity receiving the media stream would likewise not receive the metadata that was carried by the transport stream.

For instance, industry practice in accordance with the SCTE standard suggests that a media distributor should strip any splice_information packets from a transport stream before delivering the transport stream to an end-user client, in order to prevent unauthorized "commercial killers" or the like. In particular, the industry concern is that an unauthorized party could detect the presence of splice_information packets and could undesirably remove (e.g., skip past) or replace included commercials in the media stream. Although splice_information packets could be secured through scrambling and/or encryption, the packets may still be sent separately within the transport stream, and there is a risk that they could be detected and used without authorization. Consequently, it may not be feasible or practical to maintain splice_information packets in a transport stream en route to an end-user media client, and so, once more, the end-user media client may be unable to use the splice-information metadata as a basis to carry out dynamic content modification.

As another example, as a media stream is being communicated along a media-distribution path (e.g., from one entity to another), an entity within the media-distribution path might receive a transport stream that carries both the media stream and the metadata, and that entity might extract the media stream from the transport stream and forward the media stream to a downstream entity (e.g., a next or later entity in the media-distribution path) without also forwarding the metadata to the downstream entity.

For instance, a set top box or other customer-premises receiver might receive from an MVPD or other entity a transport stream that carries a media stream representing a channel of content and that also carries metadata. As the receiver receives that transport stream, the receiver may extract the media stream from the transport stream (e.g., de-packetize the media stream) and output the extracted media stream through HDMI or another interface to a TV for presentation. But in this process, the receiver may not forward to the TV the metadata that was also included in the transport stream. Therefore, the TV may not receive the metadata that was included in the transport stream and so may be unable to carry out useful action based on that metadata.

Likewise, an MVPD could receive from a content source a transport stream that carries a media stream representing a channel of content and that also carries metadata. And as the MVPD receives that transport stream, the MVPD might similarly extract the media stream from the transport stream (e.g., de-packetize the media stream) and output the extracted media stream for transmission downstream to a set top box and/or TV for presentation. In this process too, the downstream entity would not receive the metadata that was included in the transport stream and therefore may be unable to carry out useful action based on that metadata.

This technical issue of metadata being stripped or otherwise lost as the media stream is en route to a downstream entity could occur with respect to dynamic content modification. Although conveying splice information in-band within a transport stream that carries a national broadcast to an MVPD might enable the MVPD to engage in time-accurate content revision of the media stream before distributing the media stream to various customer-premises devices, it might also be desirable as noted above to allow an end-user TV to engage in dynamic content modification. Allowing the end-user TV to engage in dynamic content modification such as dynamic ad insertion might allow content modification that is tailored specifically to the end-user's interests, demographics, or the like. Yet if the metadata that accompanies the media stream is removed while the media stream is en route to the TV for playout, the TV may not receive that metadata and may therefore be unable to use the metadata as a basis to carry out the dynamic content modification.

One way to resolve this technical issue is to have an entity in the media-distribution path translate metadata carried in-band in a transport stream into the watermarking in the media stream as discussed above.

In particular, an intermediary in a media-distribution path could receive a transport stream carrying a media stream and could read metadata from the transport stream, and the intermediary could encode into the media stream a watermark (e.g., one or more watermarks) that expressly or by-reference conveys that metadata. When the downstream entity such as an end-user media client receives the media stream, the downstream entity could then conveniently decode the watermark from the media stream in order to obtain the metadata, and the downstream entity could use the metadata as a basis to carry out useful action.

Figure 3:
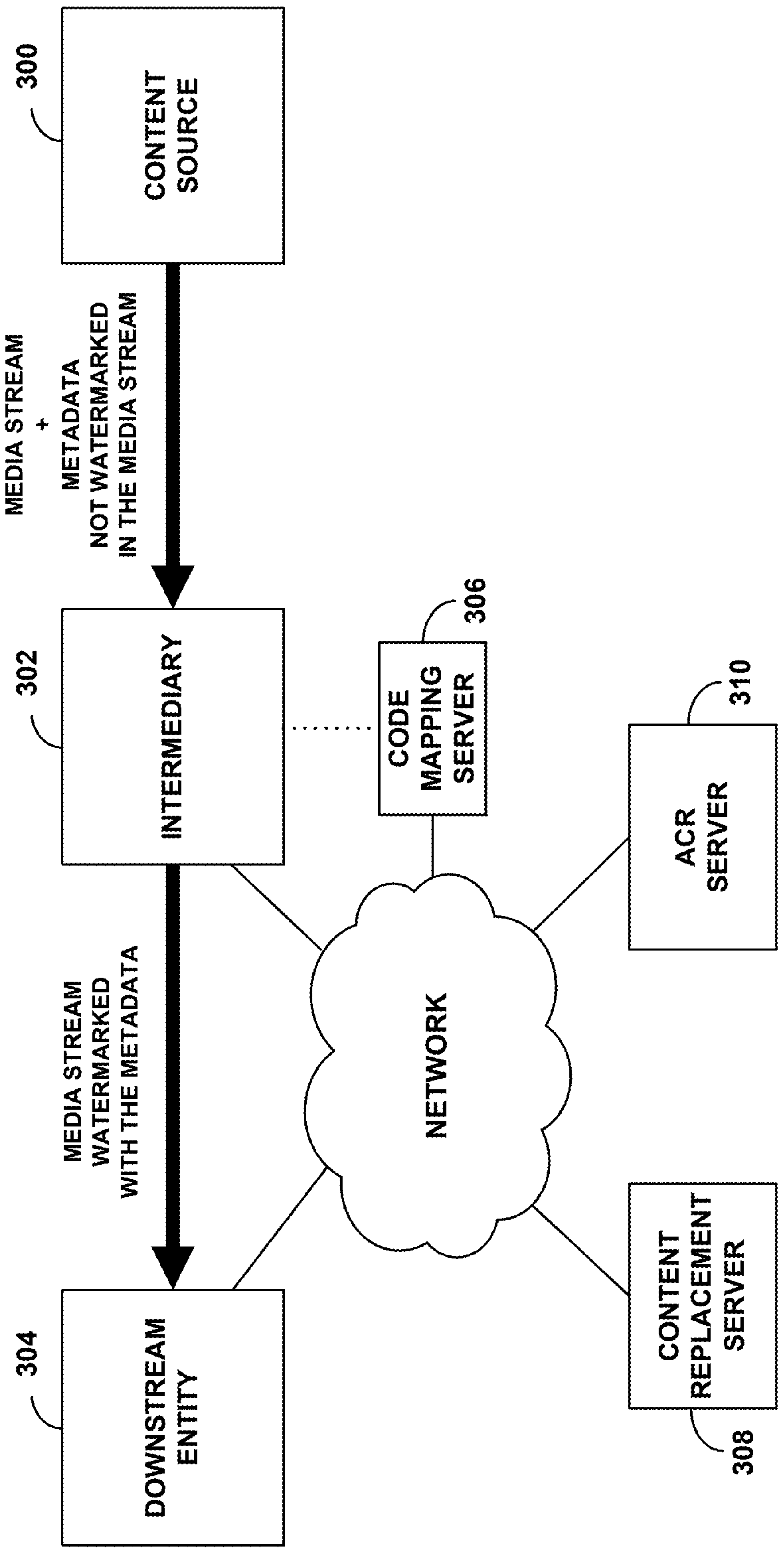
FIG. 3 is another simplified block diagram of an example system in which various disclosed principles can be applied.

FIG. 3 further illustrates an example system in which this could be done.

FIG. 3 shows at its top an example media-distribution path extending from a content source 300 to a downstream entity 304 via an intermediary 302. Without limitation, for instance, the content source 300 could be a national broadcaster such as one of those noted above, the intermediary 302 could be an MVPD such as a local affiliate of the national broadcaster, and the downstream entity 304 could be a media client, perhaps a content presentation device such as a TV or the like or a receiver such as a set top box or the like.

With this arrangement, an example media stream flows over the media-distribution path from the content source 300 to the intermediary 302 and then from the intermediary 302 to the downstream entity 304. As noted above, this media stream could comprise and thus define a sequence of digital frames of media content, such as video content and/or audio content, perhaps representing a channel of content. The content source 300 could convey this media stream to the intermediary 302 in a packet-based transport stream, by conveying segments of the media stream in payload of transport-stream packets to the intermediary 302. And the intermediary 302 could then forward the media stream, possibly also in a packet-based transport stream or possibly stripped and/or transcoded, ultimately (for present purposes) to the downstream entity 304.

As shown in FIG. 3, the content source 300 conveys to the intermediary 302 the media stream together with metadata that is not watermarked into the media stream. As noted above, for instance, if the content source 300 conveys the media stream to the intermediary 302 in a packet-based transport stream, the content source could convey the media stream together with the non-watermarked metadata by conveying the metadata in a header respectively of each of one or more packets of the transport stream or perhaps as payload in one or more special packets of the transport stream, among other possibilities.

Further, as shown, the intermediary 302 then conveys to the downstream entity 304 the media stream watermarked with the metadata. As noted above, for instance, the intermediary 302 could read the metadata from the transport stream that the intermediary 302 receives from the content source 300, and the intermediary 302 could then steganographically encode a representation of the metadata into one or more watermarks in the media stream itself. The intermediary 302 could then output the media stream so watermarked with the metadata, and that watermarked media stream could then flow directly or indirectly to the downstream entity 304. The downstream entity 304 could then detect and decode the watermark(s) from the media stream so as to obtain the metadata and could use the metadata as a basis to carry out or more useful actions.

This mechanism could facilitate conveying to the downstream entity 304 various information related to dynamic content revision among other possibilities, such as information related to the timing and/or type of a dynamic content revision that the downstream entity 304 should carry out with respect to the media stream being conveyed.

By way of example, the disclosed mechanism could facilitate conveying splice information to enable the downstream entity to carry out dynamic ad insertion in the media stream.

For instance, an MVPD as the intermediary 302 could receive from a national TV broadcaster as the content source 300 a transport stream that carries a media stream representing a TV channel including TV program content (e.g., various TV programs) and one or more commercial breaks (e.g., an ad pod defining a sequence of commercials), and the transport stream could include one or more SCTE splice_information packet carrying splice information such as a designation of a splice point as the start of a commercial break or the start of a particular commercial within the commercial break.

As the MVPD receives the transport stream from the content provider, the MVPD could monitor for and detect the presence of a splice_information packet, perhaps based on header information that indicates it is a splice_information packet and/or based on one or more other indicia. And the MVPD could then read the XML contents of the splice_information packet to determine and thus extract or otherwise obtain from the packet the splice information, such as the information regarding the designated upcoming splice point and perhaps other such metadata.

In response to detecting the splice_information packet that carries the splice information such as the designation of the splice point and upon obtaining the splice information from the packet, the MVPD could then encode into the media stream a watermark representing the obtained splice information, so that the downstream entity 304 could obtain the splice information from the watermark and could use the splice information as a basis to carry out dynamic ad insertion. Further, in line with industry practice, if MVPD would forward the transport stream to the downstream entity 304, the MVPD could also responsively strip the splice_information packet from the transport stream before forwarding the transport stream, so that the downstream entity 304 will not receive the splice_information packet.

In this example process, the MVPD or other intermediary 302 that receives the transport stream carrying a media stream en route to the downstream entity 304 and including an in-band splice_information packet that designates a splice point and/or other splice-related information could read splice-related information from the packet and could thus determine one or more characteristics of an associated splice point. Considering an SCTE splice_information packet for example, the intermediary 302 could read the packet to determine the specific time point where splicing is to occur in the media stream that is also carried by the transport stream, with the time point being immediate (meaning that the splice should occur at the nearest possible time) or being indicated as a time-offset value such as a quantity of clock ticks of a 90 kHz clock starting at the time of the splice_information packet. Further, the intermediary 302 could read the packet to determine the type of splice point, such as whether the splice point is a splice-out point or a splice-in point as discussed above.

Having read this in-band splice-information metadata from the packet, the intermediary 302 could then encode into the media content of the media stream a watermark that will be interpretable by the downstream entity 304 to enable (e.g., to cause) the downstream entity to perform a content revision in accordance with the splice information.

For instance, the intermediary 302 could expressly encode into the media content of the media stream a binary representation of the time when the downstream entity 304 should perform a content revision and perhaps further indicates the type of content revision, such as a splice-out or a splice-in, among other possibilities. Alternatively, the intermediary could encode into the media content of the stream a binary code that specifies this splice information by reference. For instance, the intermediary 302 might record at a network server (e.g., a code-mapping server) 306 a mapping between the binary code and the splice information, so that when the downstream entity 304 extracts the watermarked binary code from the media stream, the downstream entity 304 could then query the server 306 to determine the splice information based on the extracted binary code.

As to the time point of the content revision, if the in-band splice information in the transport stream specifies the time of the splice point by specifying a time offset from the time at which the splice information is positioned in the transport stream (e.g., in correlation with a time point in the media stream being carried by the transport stream), then the intermediary 302 could encode that time offset expressly or by reference in the watermark-assuming that the intermediary 302 would position the watermark at the same time point in the media stream as was specified by the splice information in the transport stream.

For instance, the intermediary 302 could encode in the watermark the actual offset value, or the intermediary 302 could encode in the watermark a value that the downstream entity 304 could map to the actual offset value by querying a code mapping server 306 as noted above or by using a mapping table or other mapping data provisioned at the downstream entity 304 or provided in the media stream or transport stream (if applicable). With a binary watermark, for example, the intermediary 302 could encode the offset using a binary value, such as with a value of 00 corresponding with an offset of 2 seconds, a value of 01 corresponding with an offset of 3 seconds, and a value of 10 corresponding with an offset of 4 seconds, among other possibilities. Thus, upon decoding the watermark and reading this value, the downstream entity 304 could carry out a content revision at the time offset determined from the watermark.

Alternatively, based on the time point indicated by the in-band splice information that the intermediary 302 read from the transport packet, the intermediary could compute an absolute time in the media stream at which the content revision should occur, and the intermediary could then encode that computed absolute time in the watermark in the media stream.

Here, the absolute time could be a time point within in a timeline of the media stream. If the media stream defines a sequence of frames that are timestamped or otherwise numbered in a manner understandable to the downstream entity 304 that will read the watermark and take action, the time point could be the frame number.

Alternatively, if the media stream defines a timeline in another manner, the time point could be a time within that timeline. By way of example, if the intermediary 302 encodes the watermark at a specific time point within the media stream, the intermediary 302 could include in the watermark a timestamp of that specific time point, generating the timestamp according to a timeline within the media stream or according to the intermediary's clock. That way, when the downstream entity 304 decodes the watermark and reads the timestamp, the downstream entity 304 could establish a time mapping (i.e., synchronous lock), such as a time offset, between the current time according to the downstream entity's own clock and the time indicated by the watermark. Further, the intermediary 302 could include in the watermark, or in a separate watermark or other message that will be received by the downstream entity 304, an indication of the absolute time where the content revision should occur, with the indicated absolute time also being according to the intermediary's clock. And upon receipt of this absolute time value, the downstream entity 304 could then apply its established time mapping to translate the indicated absolute time to a time value according to the downstream entity's own clock, so that the downstream entity 304 could then carry out the indicated content revision at the correct time point based on the downstream entity's clock.

In either case, the intermediary 302 could encode in the watermark the actual value of the absolute time, or the intermediary 302 could encode in the watermark a value that the downstream entity 304 could map to the absolute time by querying a server 206 and/or by using mapping data provisioned at the downstream entity or provided in or with media stream. Thus, upon decoding the watermark and reading this value, the downstream entity 304 could carry out a content revision at the indicated absolute time.

As to the type of content revision, if the in-band metadata in the transport stream indicates expressly or by-reference the type of content revision to apply with respect to the media stream, then the intermediary 302 could encode in the watermark, expressly or by reference, the same type of content revision. For instance, if the in-band metadata indicates that the content revision is to be a splice-out (switching from the media stream to other content), then the intermediary 302 could encode in the watermark an indication that the content revision is to be a splice-out. Whereas, if the in-band metadata indicates that the content revision is to be a splice-in (switching back from other content to the media stream), then the intermediary 302 could encode in the watermark an indication that the content revision is to be a splice-in. With a binary watermark, for instance, the intermediary could specify this with a single bit, such as with a value of "1" indicating a splice-out event and a value of "0" indicating a splice-in event. Thus, upon decoding the watermark and reading this value, the downstream entity 2-4 could carry out the type of content revision indicated.

Note also that intermediary 302 could encode in the watermark additional or other information about the content revision that the downstream entity 304 is to perform, perhaps similarly using a code that the downstream entity 304 could map to a particular action or content-revision characteristic using a server query and/or mapping data provisioned at the downstream entity 304 or provided in the media stream.

By way of example, the intermediary 302 could encode in the watermark an indication of or related to what other content the downstream entity 304 is to splice into the media stream at the indicated time point.

For instance, the intermediary 302 could encode in the watermark a code that directs the downstream entity 304 to request replacement content from a content replacement server 308, such as a replacement ad from an ad server. Further, the code could map to a specific content replacement server 308, such as by mapping to a URL of a particular content server, and perhaps further to specific replacement content that the downstream entity 304 is to request from the content replacement server 308. Upon decoding the watermark and reading this code, the downstream entity 304 could thus send to the content replacement server 308 a request for replacement content and could receive replacement content in response and then splice that replacement content into the media stream at the indicated time point.

Alternatively, the intermediary 302 could encode in the watermark a code that directs the downstream entity 304 to select replacement content from local storage at the downstream entity, such as one of various pre-cached replacement ads for instance, and the code could further map to specific replacement content that the downstream entity 304 is to retrieve from the local storage. Thus, upon decoding the watermark and reading this code, the downstream entity 304 could retrieve replacement content from its local storage and could splice that replacement content into the media stream at the indicated time point.

Further, if the in-band metadata indicates a splice-out point and specifies a duration of the content revision that is to begin at the indicated time point, such as a duration of a commercial break where dynamic ad replacement is to occur, the intermediary 302 could encode in the watermark that duration. With a binary watermark, for instance, the intermediary 302 could use several bits to specify a duration in seconds. Or the intermediary 302 could encode the duration as a binary value that the downstream entity 304 could map to the duration using mapping data. For instance, a value of 00 could correspond with 15 seconds, a value of 01 could correspond with 30 seconds, a value of 10 could correspond 60 seconds, and the so forth. Thus, upon decoding the watermark and reading this value, the downstream entity 304 could carry out a content revision for the indicated duration.

Still further, the watermark that the intermediary 302 encodes into the media content could include a code that the downstream entity 304 would interpret as a trigger for engaging in content revision, and the intermediary 302 could use another form of messaging to the downstream entity 304 to provide the downstream entity 304 with a time point, duration, and/or other characteristics of the indicated content revision. For example, the intermediary 302 could encode in the watermark a value that the downstream entity 304 would interpret as meaning that a content revision should occur, and the intermediary 302 could encode in the watermark a reference code that would map to content-revision characteristic data. And the intermediary 302 could separately transmit to the downstream entity (e.g., through out-of-band IP messaging) a message that correlates that reference code to one or more content-revision characteristics. Thus, upon decoding the watermark and reading this reference code, the downstream entity 304 could map the reference code to the indicated content-revision characteristics and could carry out the content revision accordingly.

Yet further, as another implementation, the watermark that the intermediary 302 encodes into the media content could include a code that the downstream entity 304 would interpret as a trigger for engaging in content revision where next appropriate in the media stream, e.g., at a next appropriate content-revision opportunity.

For instance, for video content (e.g., a video-only stream, or a video component of a media stream that also includes an audio component), this code could direct the downstream entity 304 to engage in a content revision at the next instance where the media stream transitions to one or more black frames (perhaps indicative of a point where program content may transition to a commercial break or where one commercial may transition to another commercial). Upon decoding the watermark and reading this code, the downstream entity 304 could then responsively monitor the video stream to detect when the black frames occur and, upon detecting the black frames, could then responsively carry out the content revision.

One way for the downstream entity 304 to detect the presence of black frames is to engage in fingerprint analysis and ACR. For instance, in response to detecting the watermark, the downstream entity 304 could begin a process of generating a digital query fingerprint of each of various frames of the video stream and transmitting the generated digital query fingerprints to an ACR server 310 for analysis, or by self-analyzing the fingerprints. Through the fingerprint analysis, individual frames of the video stream could be deemed black frames. Alternatively, the downstream entity 304 could detect presence of black frames in another manner. In any event, upon thereby detecting the presence of black frames, the downstream entity 304 could then responsively carry out the content revision.

Likewise, for audio content (e.g., an audio-only stream, or an audio component of a media stream that also includes a video component), this code could direct the downstream entity 304 to engage in a content revision at the next instance where the media stream transitions to a threshold long duration of silence (perhaps similarly indicative of a point where program content may transition to a commercial break, or where one commercial may transition to another commercial). Upon decoding the watermark and reading this code, the downstream entity 304 could then responsively monitor the audio stream to detect when the threshold long duration of silence occurs and, upon detecting the that duration of silence, could then responsively carry out the content revision.

In a non-limiting example implementation, as noted above, the downstream entity 304 could be a set to box that operates to receive the transport stream and to transmit the media content of the stream (e.g., via HDMI or another connection mechanism) to a TV or other such content presentation device, and perhaps to store the media content for later output. Such a set top box could be pre-provisioned with mapping data as discussed above and with replacement ad content or the ability to obtain replacement ad content from a network server or the like. Thus, when the set top box receives the transport stream and decodes the watermark inserted by the intermediary 302, the set top box could appropriately interpret the watermark and could respond by carrying out dynamic ad insertion.

Alternatively, the downstream entity 304 could be a TV or other content presentation device, which might receive the media content of the media stream by receiving the transport stream or by receiving the media content from a set top box or other entity, and may present the media content to a user. Such a content presentation device could likewise be pre-provisioned with mapping data as discussed above and with replacement ad content or the ability to obtain replacement ad content from a network server or the like. Thus, when the content presentation device receives the media content and decodes the watermark, the content presentation device could appropriately interpret the watermark and respond by carry out desired dynamic ad insertion.

Further, this process could be carried out respectively for each of various downstream entities, so that it would be technically feasible to provide more targeted dynamic ad insertion, without passing the SCTE splice_information packet along to each downstream entity. For instance, a downstream TV receiver at one household may receive from an MVPD a transport stream carrying the media stream with the watermark added by the MVPD, and the receiver may responsively splice into the media stream an ad that is selected based on demographics or preferences of that household, whereas a downstream TV receiver at another household may receive from the MVPD the same transport stream carrying the same media stream with the same added watermark and may responsively splice into the underlying media stream a different ad that is selected based on demographics or preferences of that other household.

Figure 4:
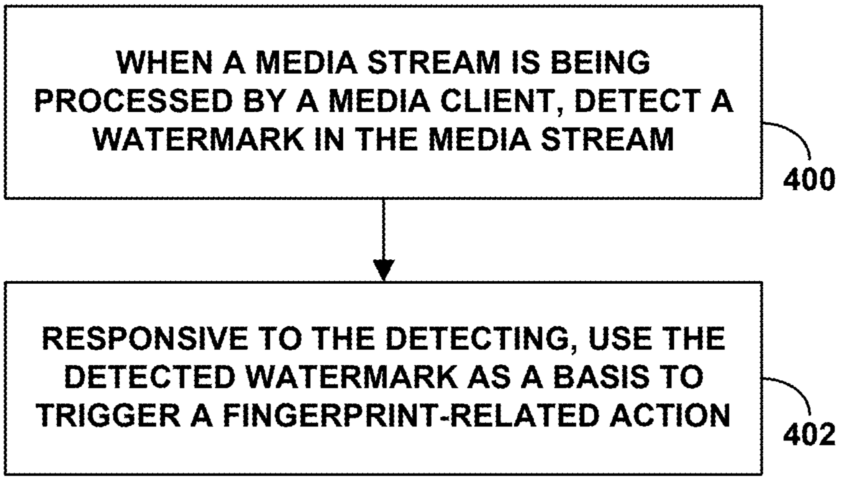
FIG. 4 is a flow chart depicting a method that could be carried out in accordance with the disclosure.

FIG. 4 is next a flow chart depicting a method that can be carried out in accordance with the present disclosure.

As shown in FIG. 4, at block 400, the method includes detecting a watermark in a media stream being processed by a media client. And at block 402, the method includes, responsive to the detecting, using the detected watermark as a basis to trigger a fingerprint-related action.

In line with the discussion above, this method could be carried out at least in part by the media client. Alternatively or additionally, the method could be carried out by an entity in a media-distribution path along which the media stream flows to the media client. And in the latter case, the act of using the detected watermark as a basis to trigger the fingerprint-related action could involve transmitting out-of-band from the entity to the media client information ascertained based on the watermark in the media stream, to enable the media client to carry out or cause to be carried out the fingerprint-related action.

As further discussed above, the fingerprint-related action could take various forms, possibly fingerprint-ACR related. As examples, the fingerprint-related action could comprise (i) the media client starting to generate query fingerprints of the media stream that is being processed by the media client, (ii) the media client increasing a rate of generation of query fingerprints of the media stream that is being processed by the media client, (iii) starting to report fingerprints to another entity, (iv) engaging in signaling to obtain fingerprints for use to perform a fingerprint comparison, and/or (v) engaging in fingerprint comparison. Further, as discussed above, the fingerprint-related action could facilitate dynamic content revision, such as dynamic ad replacement for instance.

As yet further discussed above, the watermark could be added to the media stream based on transport stream metadata. For instance, an entity in a media-distribution path along which the media stream flows to the media client could add the watermark to the media stream, including (i) obtaining, from a transport stream that carries the media stream, metadata that is not watermarked into the media stream and (ii) encoding the obtained metadata as information in the watermark in the media stream.

Figure 5:
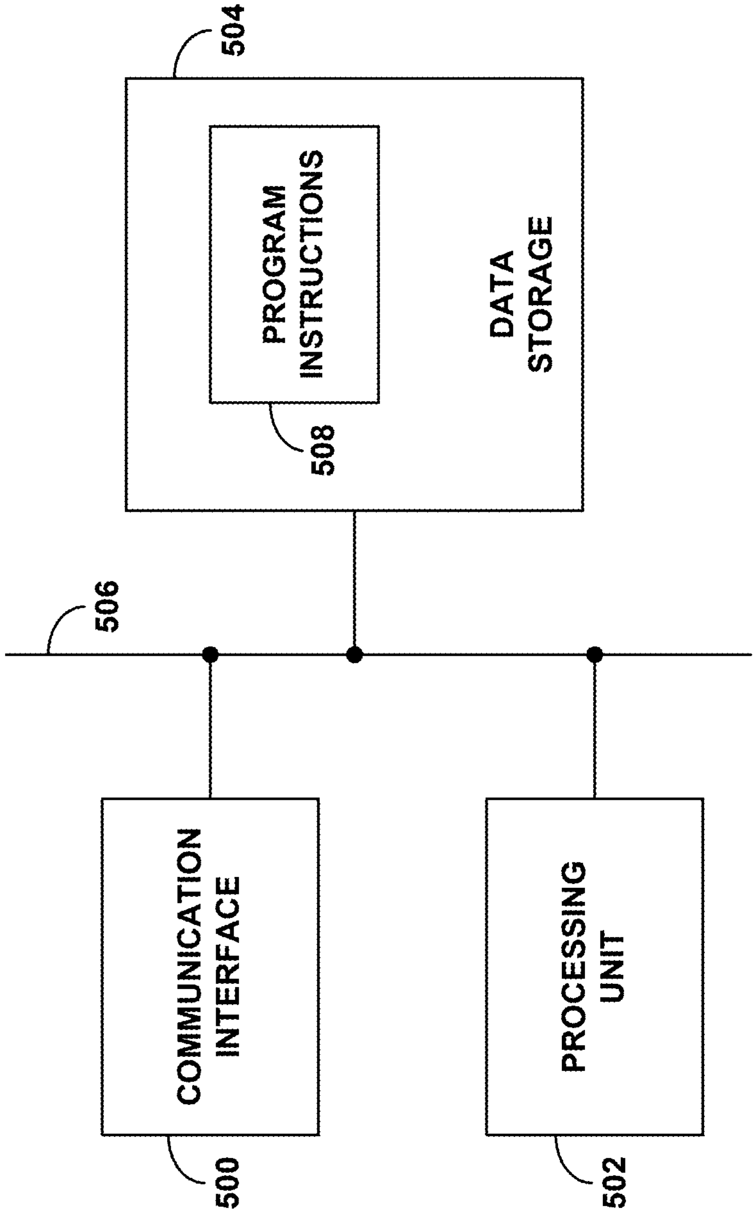
FIG. 5 is a simplified block diagram of an example computing system that could operate in accordance with the disclosure.

FIG. 5 is a simplified block diagram of a computing system that could operate in accordance with the present disclosure. This computing system could represent the content distribution system 202 or other intermediary 302 as discussed above, or for that matter a media client 204 or other downstream entity 304 as discussed above, among other possibilities.

As shown in FIG. 5, the computing system includes a communication interface 500, a processing unit 502, and non-transitory data storage 504, any or all of which could be integrated together or, as shown, communicatively linked together by a system bus, network, or other connection mechanism 506.

The communication interface 500 could comprise one or more network connection mechanisms to facilitate communication with one or more other entities. Each such network communication interface could comprise a wireless or wired Ethernet interface or other type of network interface, for engaging in IP communication and/or other type of network communication.

The processing unit 502 could comprise one or more general purpose processors (e.g., microprocessors) and/or one or more specialized processors (e.g., application specific integrated circuits). And the non-transitory data storage 504 could comprise one or more volatile and/or non-volatile storage components, such as optical, magnetic, or flash storage for instance. Further, as shown, the data storage 504 of the example computing system stores program instructions 508. These program instructions could be executable by the processing unit 502 to carry out (e.g., to cause the computing system to carry out) various operations described herein.

Various features discussed above can be implemented in this context as well, and vice versa.

Figure 6:
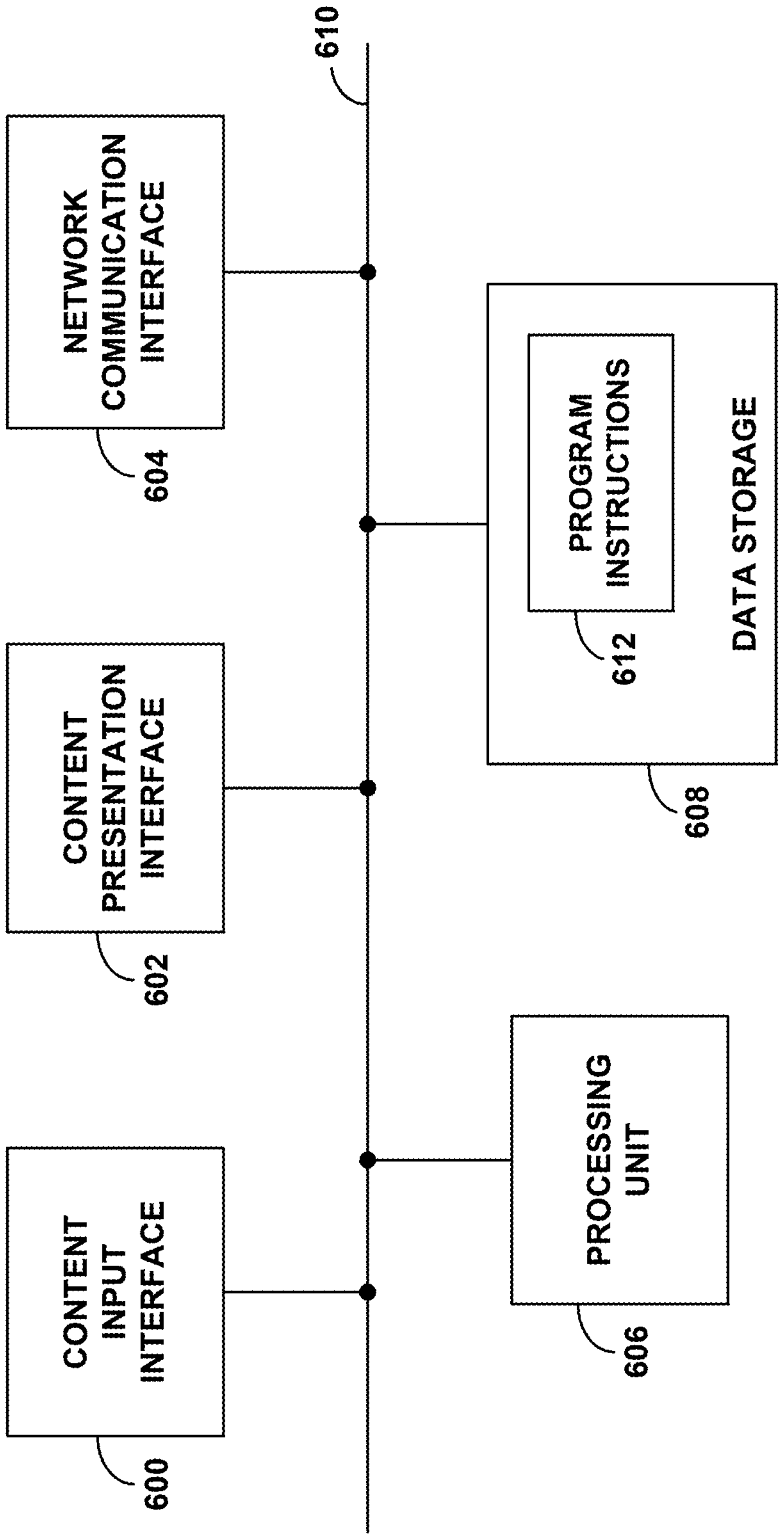
FIG. 6 is a simplified block diagram of an example content presentation device that could operate in accordance with the disclosure.

Finally, FIG. 6 is a simplified block diagram of an example content presentation device, operable in accordance with the present disclosure as a non-limiting example of a media client. This content presentation device could take various forms. For instance, it could be a television, computer monitor, or other device that operates to receive and render video content, and/or it could be a loudspeaker, a pair of headphones, or other device that operates to receive and render audio content. Numerous other examples are possible as well.

As shown in FIG. 6, the example content presentation device includes a content input interface 600, a content presentation interface 602, a network communication interface 604, a processing unit 606, and non-transitory data storage 608, any or all of which could be integrated together or, as shown, communicatively linked together by a system bus, network, or other connection mechanism 610.

Content input interface 600 could comprise a physical communication interface for receiving media content, such as a media stream, to be presented by the content presentation device. As such, the media input interface could include one or more wired and/or wireless interfaces for establishing communication with and receiving media content in analog or digital form from a receiver or other device or system. For example, the media input interface could include one or more interfaces compliant with protocols such as DVI, HDMI, VGA, USB, BLUETOOTH, WIFI, among numerous others, and/or a tuner and/or receiver for receiving content more directly from a content distributor or the like.

The content presentation interface 602 could then comprise one or more components to facilitate presentation of the received media content. By way of example, the content presentation interface 602 could comprise a user interface such as a display screen and/or a loudspeaker, as well as one or more drivers or other components for processing the received media content to facilitate presentation of the content on the user interface.

The network communication interface 604 could comprise a network connection mechanism to facilitate communication on a network, and/or for engaging in direct or networked communication with one or more other local or remote entities. As such, the network communication interface could comprise a wireless or wired Ethernet interface or other type of network interface, for engaging in IP communication and/or other type of network communication.

The processing unit 606 could then comprise one or more general purpose processors (e.g., microprocessors) and/or one or more specialized processors (e.g., application specific integrated circuits). And the non-transitory data storage 608 could comprise one or more volatile and/or non-volatile storage components, such as optical, magnetic, or flash storage. Further, the data storage 608 stores program instructions 612, which could be executable by processing unit 606 to carry out (e.g., to cause the content presentation device to carry out) various operations described herein.

For instance, these operations could include processing a media stream for presentation and, while processing the media stream for presentation, (i) detecting in the media stream a watermark and (ii) responsive to detecting the watermark, carrying out a fingerprint-related action. Further, as discussed above, the fingerprint-related action could comprise a fingerprint-ACR-related action. And examples of the fingerprint-related action include, without limitation, (i) the media client starting to generate query fingerprints of the media stream that is being processed by the media client, (ii) the media client increasing a rate of generation of query fingerprints of the media stream that is being processed by the media client, (iii) the media client starting to report query fingerprints of the media stream to another entity, (iv) the media client engaging in signaling to obtain reference fingerprints for use to perform fingerprint comparison, and/or (v) the media client engaging in fingerprint comparison.

Various features described above could be applied in this context as well, and vice versa.

Further, the present disclosure also contemplates at least one non-transitory computer readable medium encoded with or otherwise embodying program instructions executable by at least one processing unit to carry out various operations as described herein.

Exemplary embodiments have been described above. Those skilled in the art will understand, however, that changes and modifications may be made to these embodiments without departing from the true scope and spirit of the invention.

The invention claimed is:

1. A non-transitory computer-readable medium having instructions stored thereon that, when executed by a media client, cause the media client to perform operations comprising:
- extracting, from an out-of-band signal, a watermark payload including an advertisement identifier of an upcoming advertisement in a media stream being processed by the media client, wherein the watermark payload comprises a time offset;
- establishing a synchronous lock between a current time according to a clock of the media client and the time offset;
- receiving digital reference fingerprints representing the upcoming advertisement corresponding to the advertisement identifier;
- transitioning from generating digital query fingerprints representing the media stream at a first non-zero fingerprint-generation rate to a second fingerprint-generation rate that is greater than the first non-zero fingerprint-generation rate; and
- comparing digital query fingerprints generated at the second fingerprint-generation rate with the digital reference fingerprints to determine when in the media stream the upcoming advertisement begins.

2. The non-transitory computer-readable medium of claim 1, wherein the digital reference fingerprints also represent media content preceding the upcoming advertisement.

3. The non-transitory computer-readable medium of claim 1, wherein the media client comprises a streaming media receiver or a television.

4. The non-transitory computer-readable medium of claim 1, wherein the operations further comprise:
- engaging in content modification of a modifiable-content segment of the media stream corresponding to the upcoming advertisement;
- generating digital query fingerprints of the modifiable-content segment during the content modification; and
- comparing the digital query fingerprints of the modifiable-content segment with the digital reference fingerprints.

5. The non-transitory computer-readable medium of claim 4, wherein the operations further comprise:
- determining, based on the comparing, that the digital query fingerprints of the modifiable-content segment do not match the digital reference fingerprints; and
- based at least on a determination of a mismatch, stopping the content modification.

6. The non-transitory computer-readable medium of claim 5, wherein the operations further comprise reverting to play the modifiable-content segment of the media stream.

7. The non-transitory computer-readable medium of claim 1, wherein the watermark payload comprises an absolute time, the operations further comprise establishing a time mapping to translate the absolute time to the current time according to the clock of the media client.

8. The non-transitory computer-readable medium of claim 1, wherein the operations further comprise:
- receiving, via Internet Protocol (IP) messaging, a message that correlates a reference code in the watermark payload with content-revision characteristics; and performing the content-revision characteristics on the media stream.

9. A method for a media client, comprising:

extracting, by at least one computer processor, from an out-of-band signal, a watermark payload including an advertisement identifier of an upcoming advertisement in a media stream being processed by the media client, wherein the watermark payload comprises an absolute time;

establishing a time mapping to translate the absolute time to a current time according to a clock of the media client;

receiving digital reference fingerprints representing the upcoming advertisement corresponding to the advertisement identifier;

transitioning from generating digital query fingerprints representing the media stream at a first non-zero fingerprint-generation rate to a second fingerprint-generation rate that is greater than the first non-zero fingerprint-generation rate; and comparing digital query fingerprints generated at the second fingerprint-generation rate with the digital reference fingerprints to determine when in the media stream the upcoming advertisement begins.

10. The method of claim 9, wherein the digital reference fingerprints also represent media content preceding the upcoming advertisement.

11. The method of claim 9, wherein the media client comprises a streaming media receiver or a television.

12. The method of claim 9, further comprising:

engaging in content modification of a modifiable-content segment of the media stream corresponding to the upcoming advertisement;

generating digital query fingerprints of the modifiable-content segment during the content modification; and comparing the digital query fingerprints of the modifiable-content segment with the digital reference fingerprints.

13. The method of claim 12, further comprising:

determining, based on the comparing, that the digital query fingerprints of the modifiable-content segment do not match the digital reference fingerprints; and based at least on a determination of a mismatch, stopping the content modification.

14. The method of claim 13, further comprising reverting to play the modifiable-content segment of the media stream.

15. A media client, comprising:

one or more memories; and at least one processor each coupled to at least one of the memories and configured to perform operations comprising:

extracting, from an out-of-band signal, a watermark payload including an advertisement identifier of an upcoming advertisement in a media stream being processed by the media client;

receiving digital reference fingerprints representing the upcoming advertisement corresponding to the advertisement identifier;

transitioning from generating digital query fingerprints representing the media stream at a first non-zero fingerprint-generation rate to a second fingerprint-generation rate that is greater than the first non-zero fingerprint-generation rate;

comparing digital query fingerprints generated at the second fingerprint-generation rate with the digital reference fingerprints to determine when in the media stream the upcoming advertisement begins;

receiving, via Internet Protocol (IP) messaging, a message that correlates a reference code in the watermark payload with content-revision characteristics; and performing the content-revision characteristics on the media stream.

16. The media client of claim 15, wherein the digital reference fingerprints also represent media content preceding the upcoming advertisement.

17. The media client of claim 15, wherein the media client comprises a streaming media receiver or a television.

18. The media client of claim 15, wherein the operations further comprise:

engaging in content modification of a modifiable-content segment of the media stream corresponding to the upcoming advertisement;

generating digital query fingerprints of the modifiable-content segment during the content modification; and comparing the digital query fingerprints of the modifiable-content segment with the digital reference fingerprints.

19. The media client of claim 18, wherein the operations further comprise:

determining, based on the comparing, that the digital query fingerprints of the modifiable-content segment do not match the digital reference fingerprints; and based at least on a determination of a mismatch, stopping the content modification.

20. The media client of claim 19, wherein the operations further comprise reverting to play the modifiable-content segment of the media stream.

* * * * *